United States Patent
Chen et al.

(10) Patent No.: US 10,218,985 B2
(45) Date of Patent: Feb. 26, 2019

(54) INTRA-FRAME DEPTH MAP BLOCK ENCODING AND DECODING METHODS, AND APPARATUS

(71) Applicant: Huawei Technologies Co., Ltd., Shenzhen, Guangdong (CN)

(72) Inventors: Xu Chen, Shenzhen (CN); Xiaozhen Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/389,196

(22) Filed: Dec. 22, 2016

(65) Prior Publication Data

US 2017/0105008 A1    Apr. 13, 2017

Related U.S. Application Data

(63) Continuation of application No. PCT/CN2015/081078, filed on Jun. 9, 2015.

(30) Foreign Application Priority Data

Jun. 26, 2014 (CN) .......................... 2014 1 0300985

(51) Int. Cl.
*H04N 19/159* (2014.01)
*H04N 19/46* (2014.01)
(Continued)

(52) U.S. Cl.
CPC ......... *H04N 19/159* (2014.11); *H04N 19/147* (2014.11); *H04N 19/176* (2014.11);
(Continued)

(58) Field of Classification Search
None
See application file for complete search history.

(56) References Cited

U.S. PATENT DOCUMENTS

| 2015/0319459 A1 | 11/2015 | Zheng |
| 2016/0037185 A1 | 2/2016 | Zheng |

FOREIGN PATENT DOCUMENTS

| CN | 103067715 A | 4/2013 |
| CN | 103237214 A | 8/2013 |

(Continued)

OTHER PUBLICATIONS

Gu, Zhouye, et al., "3D-CE5.h related: Simplified DC predictor improvement for depth intra modes," Joint Collaborative Team on 3D Video Coding Extension Development of ITU-T SG 16 WP3 and ISO/IEC JTC 1/SC 29/WG 11, Document: JCT3V-F0157, 6th Meeting, Geneva, Switzerland, Oct. 25-Nov. 1, 2013, 6 pages.

(Continued)

*Primary Examiner* — Anand S Rao
*Assistant Examiner* — Tyler B Edwards

(57) ABSTRACT

The present invention discloses an intra-frame depth map block encoding method, including: acquiring a depth map block to be encoded; when a depth modeling mode (DMM) is applied to a recursive quadtree (RQT) or simplified depth coding (SDC) to encode the depth map block, separately detecting the depth map block by using a DMM1 mode and a DMM4 mode in the DMM, to obtain rate-distortion results of the depth map block in the DMM1 mode and in the DMM4 mode; and determining that a DMM with a smallest rate-distortion result in the DMM1 and the DMM4 is a DMM used during encoding, applying the used mode to the RQT or the SDC to encode the depth map block, and writing the used DMM to a bitstream.

16 Claims, 6 Drawing Sheets

(51) Int. Cl.

| | |
|---|---|
| *H04N 19/147* | (2014.01) |
| *H04N 19/597* | (2014.01) |
| *H04N 19/176* | (2014.01) |
| *H04N 19/96* | (2014.01) |
| H04N 19/172 | (2014.01) |
| H04N 19/182 | (2014.01) |
| H04N 19/184 | (2014.01) |

(52) U.S. Cl.
CPC ........... *H04N 19/46* (2014.11); *H04N 19/597* (2014.11); *H04N 19/96* (2014.11); *H04N 19/172* (2014.11); *H04N 19/182* (2014.11); *H04N 19/184* (2014.11)

(56) References Cited

FOREIGN PATENT DOCUMENTS

| | | | | | |
|---|---|---|---|---|---|
| CN | 103237216 | A | * | 8/2013 | ........... H04N 19/597 |
| CN | 103237216 | A | | 8/2013 | |
| CN | 103281541 | A | | 9/2013 | |
| CN | 103686165 | A | | 3/2014 | |
| CN | 104079943 | A | | 10/2014 | |
| WO | 2014005248 | A1 | | 1/2014 | |
| WO | 2014036848 | A1 | | 3/2014 | |
| WO | 2014043828 | A1 | | 3/2014 | |

OTHER PUBLICATIONS

ISO/IEC; "Test Model Under Consideration for HEVC Based 3D Video Coding"; JTC1/SC29/WG11 MPEG 2011/N12559; San Jose, California, USA; Feb. 2012; 44 pages.

\* cited by examiner

INTRA-FRAME DEPTH MAP BLOCK ENCODING AND DECODING METHODS, AND APPARATUS

CROSS-REFERENCE TO RELATED APPLICATIONS

This application is a continuation of International Application No. PCT/CN2015/081078, filed on Jun. 9, 2015, which claims priority to Chinese Patent Application No. 201410300985.X, filed on Jun. 26, 2014. The disclosures of the aforementioned applications are hereby incorporated by reference in their entireties.

TECHNICAL FIELD

The present invention relates to the field of encoding and decoding technologies, and in particular, to intra-frame depth map block encoding and decoding methods and an apparatus.

BACKGROUND

At present, an image encoding process is: An encoder side obtains an encoded image and prediction information of the encoded image, so as to obtain a residual of the encoded image; and on a decoder side, the decoder side performs according to the prediction information and the residual of the image, decoding to obtain an image that is before encoding.

At present, a 3D encoding and decoding technology includes multiple encoding and decoding technologies, for example: a recursive quadtree encoding (RQT) technology. In 3D encoding/decoding, to reflect depth information of an image, a depth map needs to be encoded/decoded. Therefore, compared with conventional texture encoding/decoding, an image block segmentation method for a depth modeling mode (DMM) is added. The DMM includes two modes: a DMM1 mode, and a DMM4 mode. In the DMM1 (Depth modeling mode 1), an image block is segmented in a wedge manner, and in the DMM4 (Depth modeling mode 4), prediction segmentation is performed according to a corresponding texture reference block.

A DMM technology may be implemented in combination with an RQT technology. According to characteristics of a depth map, in a process of applying an DMM to an RQT, the DMM may be implemented by using four modes, and the four modes may be marked with numbers. In this way, during encoding/decoding of a depth map block, the four modes need to be detected, and during decoding, two modes need to be detected as well, causing high encoding/decoding complexity, and low encoding/decoding efficiency.

SUMMARY

Embodiments of the present invention provide intra-frame depth map block encoding and decoding methods, which can reduce detection modes in an encoding/decoding process, reduces encoding/decoding complexity, and improves encoding/decoding efficiency. The embodiments of the present invention further provide a corresponding apparatus.

A first aspect of the present invention provides an intra-frame depth map block encoding method, including:
acquiring a depth map block to be encoded;
when a depth modeling mode DMM is applied to a recursive quadtree RQT or simplified depth coding SDC to encode the depth map block, separately detecting the depth map block by using a DMM1 mode and a DMM4 mode in the DMM, to obtain a rate-distortion result of the depth map block in the DMM1 mode and a rate-distortion result of the depth map block in the DMM4 mode; and
determining that a DMM mode with a smallest rate-distortion result in the DMM1 and the DMM4 is a DMM mode used during encoding, applying the used mode to the RQT or the SDC to encode the depth map block, and writing the used DMM mode to a bitstream.

With reference to the first aspect, in a first possible implementation manner, for the writing the used DMM mode to a bitstream, the method further includes:
writing, to the bitstream, a coding flag used to indicate the RQT or the SDC, where the coding flag is used to instruct a decoder side to perform decoding according to the RQT or the SDC indicated by the coding flag.

With reference to the first aspect or the first possible implementation manner of the first aspect, in a second possible implementation manner, the applying the used mode to the RQT or the SDC to encode the depth map block includes:
obtaining a block predicted value and a block offset value of a depth map subblock obtained through segmentation in the used DMM mode, and residual information of each pixel in the depth map subblock according to the used DMM mode, where
the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

With reference to the second possible implementation manner of the first aspect, in a third possible implementation manner, before the obtaining residual information of each pixel in the depth map subblock, the method further includes:
adding a block predicted value and the block offset value of the same depth map subblock, to obtain a district constant value of the same depth map subblock; and
subtracting the district constant value from an original pixel value of each pixel in the same depth map subblock, to obtain the residual information of each pixel in the depth map subblock.

With reference to the third possible implementation manner of the first aspect, in a fourth possible implementation manner, the adding a block predicted value and the block offset value of the same depth map subblock, to obtain a district constant value of the same depth map subblock includes:
when a block offset value of at least one depth map subblock is 0, using a predicted value of the depth map subblock whose block offset value is 0 as a district constant value of the depth map subblock whose block offset value is 0.

A second aspect of the present invention provides an intra-frame depth map block decoding method, including:
acquiring, from a bitstream, a DMM mode used during encoding a depth map block to be decoded;
applying the DMM mode used during encoding to a recursive quadtree RQT or simplified depth coding SDC to decode the depth map block; and
obtaining the decoded depth map block.

With reference to the second aspect, in a first possible implementation manner, for the acquiring, from a bitstream, a DMM mode used during encoding a depth map block to be decoded, the method further includes:

acquiring, from the bitstream, an identifier used to indicate whether the RQT or the SDC is used during encoding; and the applying the DMM mode used during encoding to a recursive quadtree RQT or simplified depth coding SDC to decode the depth map block includes:

applying, according to the identifier indicating whether the RQT or the SDC is used during encoding, the DMM mode used during encoding to the RQT or the SDC indicated by the identifier, to decode the depth map block.

With reference to the second aspect or the first possible implementation manner of the second aspect, in a second possible implementation manner, the applying the DMM mode used during encoding to a recursive quadtree RQT or simplified depth coding SDC to decode the depth map block includes:

obtaining a block predicted value and a block offset value of a depth map subblock obtained through segmentation in the DMM mode used during encoding, and residual information of each pixel in the depth map subblock according to the DMM mode used during encoding, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

With reference to the second possible implementation manner of the second aspect, in a third possible implementation manner, before the obtaining residual information of each pixel in the depth map subblock, the method further includes:

adding a block predicted value and the block offset value of the same depth map subblock, to obtain a district constant value of the same depth map subblock; and subtracting the district constant value from an original pixel value of each pixel in the same depth map subblock, to obtain the residual information of each pixel in the depth map subblock.

With reference to the second possible implementation manner of the second aspect, in a fourth possible implementation manner, the adding a block predicted value and the block offset value of the same depth map subblock, to obtain a district constant value of the same depth map subblock includes:

when a block offset value of at least one depth map subblock is 0, using a predicted value of the depth map subblock whose block offset value is 0 as a district constant value of the depth map subblock whose block offset value is 0.

A third aspect of the present invention provides an encoding apparatus, including:

an acquiring unit, configured to acquire a depth map block to be encoded;

a detection unit, configured to: when a depth modeling mode DMM is applied to a recursive quadtree RQT or simplified depth coding SDC to encode the depth map block acquired by the acquiring unit, separately detect the depth map block by using a DMM1 mode and a DMM4 mode in the DMM, to obtain a rate-distortion result of the depth map block in the DMM1 mode and a rate-distortion result of the depth map block in the DMM4 mode; and an encoding unit, configured to: determine that a DMM mode, whose rate-distortion result is the smallest in the rate-distortion results of the DMM1 and the DMM4 that are obtained through detection by the detection unit, is a DMM mode used during encoding, apply the used mode to the RQT or the SDC to encode the depth map block, and write the used DMM mode to a bitstream.

With reference to the third aspect, in a first possible implementation manner, the encoding unit is further configured to write, to the bitstream, a coding flag used to indicate the RQT or the SDC, where the coding flag is used to instruct a decoder side to perform decoding according to the RQT or the SDC indicated by the coding flag.

With reference to the third aspect or the first possible implementation manner of the third aspect, in a second possible implementation manner, the encoding unit is specifically configured to obtain a block predicted value and a block offset value of a depth map subblock obtained through segmentation in the used DMM mode, and residual information of each pixel in the depth map subblock according to the used DMM mode, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

With reference to the second possible implementation manner of the third aspect, in a third possible implementation manner, the encoding unit is specifically configured to: add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

With reference to the third possible implementation manner of the third aspect, in a fourth possible implementation manner, the encoding unit is specifically configured to: when a block offset value of at least one depth map subblock is 0, use a predicted value of the depth map subblock whose block offset value is 0 as a district constant value of the depth map subblock whose block offset value is 0.

A fourth aspect of the present invention provides a decoding apparatus, including:

an acquiring unit, configured to acquire, from a bitstream, a DMM mode used during encoding a depth map block to be decoded;

a decoding unit, configured to apply the DMM mode used during encoding to a recursive quadtree RQT or simplified depth coding SDC to decode the depth map block acquired by the acquiring unit; and an obtaining unit, configured to obtain the depth map block decoded by the decoding unit.

With reference to the fourth aspect, in a first possible implementation manner, the acquiring unit is further configured to acquire, from the bitstream, an identifier used to indicate whether the RQT or the SDC is used during encoding; and the decoding unit is specifically configured to apply, according to the identifier indicating whether the RQT or the SDC is used during encoding, the DMM mode used during encoding to the RQT or the SDC indicated by the identifier, to decode the depth map block.

With reference to the fourth aspect or the first possible implementation manner of the fourth aspect, in a second possible implementation manner, the decoding unit is specifically configured to obtain a block predicted value and a block offset value of a depth map subblock obtained through segmentation in the DMM mode used during encoding, and residual information of each pixel in the depth map subblock according to the DMM mode used during encoding, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

With reference to the second possible implementation manner of the fourth aspect, in a third possible implementation manner, the decoding unit is specifically configured to: add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

With reference to the third possible implementation manner of the fourth aspect, in a fourth possible implementation manner, the decoding unit is specifically configured to: when a block offset value of at least one depth map subblock is 0, use a predicted value of the depth map subblock whose block offset value is 0 as a district constant value of the depth map subblock whose block offset value is 0.

According to the embodiments of the present invention, a depth map block to be encoded is acquired; when a depth modeling mode DMM is applied to a recursive quadtree RQT or simplified depth coding SDC to encode the depth map block, the depth map block is separately detected by using a DMM1 mode and a DMM4 mode in the DMM, to obtain a rate-distortion result of the depth map block in the DMM1 mode and a rate-distortion result of the depth map block in the DMM4 mode; and it is determined that a DMM mode with a smallest rate-distortion result in the DMM1 and the DMM4 is a DMM mode used during encoding, the used mode is applied to the RQT or the SDC to encode the depth map block, and the used DMM mode is written to a bitstream. Compared with the prior art in which four modes need to be detected during encoding/decoding, according to the encoding method provided in the embodiments of the present invention, only two modes need to be detected. Therefore, encoding complexity is reduced, and encoding efficiency is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The embodiments of the present invention provide intra-frame depth map block encoding and decoding methods, which can reduce detection modes in an encoding/decoding process, reduces encoding/decoding complexity, and improves encoding/decoding efficiency. The embodiments of the present invention further provide a corresponding apparatus. Detailed descriptions are provided below separately.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
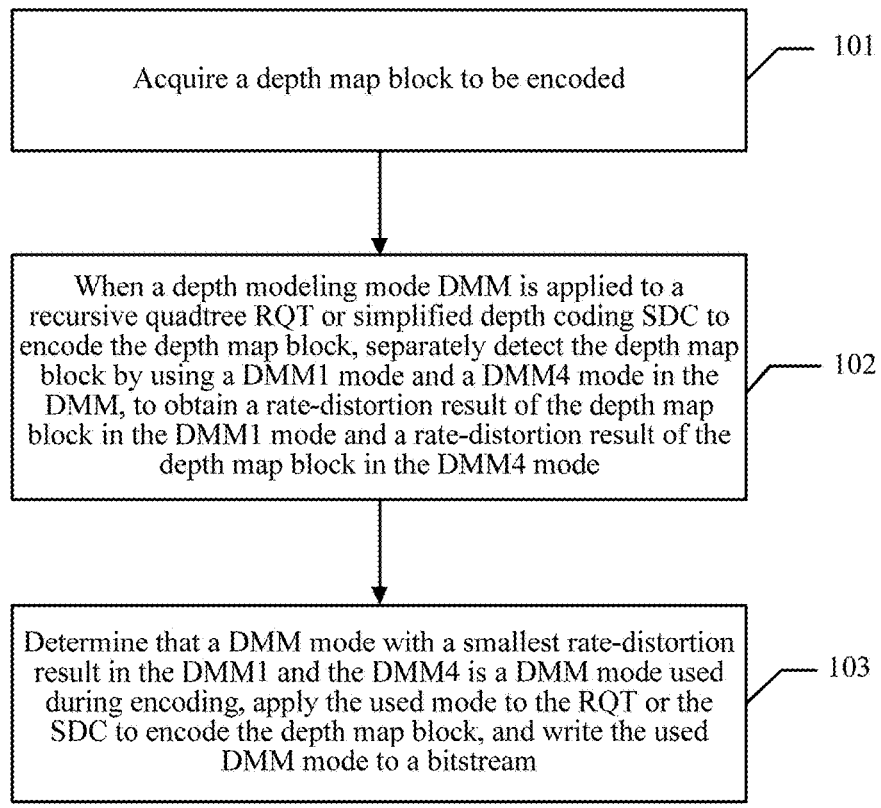
FIG. 1 is a schematic diagram of an embodiment of an encoding method according to an embodiment of the present invention.

Referring to FIG. 1, an embodiment of an intra-frame depth map block encoding method according to an embodiment of the present invention includes:

101: Acquire a depth map block to be encoded.

102: When a depth modeling mode DMM is applied to a recursive quadtree RQT (Recur Intra Coding Quart Tree, RQT) or simplified depth coding SDC (Simplify Depth Coding, SDC) to encode the depth map block, separately detect the depth map block by using a DMM1 mode and a DMM4 mode in the DMM, to obtain a rate-distortion result of the depth map block in the DMM1 mode and a rate-distortion result of the depth map block in the DMM4 mode.

The depth modeling mode (Depth modeling modes, DMM) is an image segmentation method, and the DMM includes two modes: the DMM1 and the DMM4. In the DMM1 (Depth modeling mode 1), an image block is segmented in a wedge manner, and in the DMM4 (Depth modeling mode 4), prediction segmentation is performed according to a corresponding texture reference block. For the DMM1, refer to FIG. 2 for understanding, and for the DMM4, refer to FIG. 3 for understanding.

A depth map block has one rate-distortion result in the DMM1 mode and one rate-distortion result in the DMM4. A process of calculating a rate-distortion result belongs to the prior art, and is not described in detail in this application.

103: Determine that a DMM mode with a smallest rate-distortion result in the DMM1 and the DMM4 is a DMM mode used during encoding, apply the used mode to the RQT or the SDC to encode the depth map block, and write the used DMM mode to a bitstream.

After both the rate-distortion results of the DMM1 and the DMM4 are calculated, a DMM mode with a smaller rate-distortion result is selected and is combined in a preset encoding technology.

When the rate-distortion result of the DMM1 is smaller, and when encoding is performed by using an RQT technology during encoding, the DMM1 is combined in the RQT technology.

When the DMM1 is used, and when encoding is performed by using the RQT, the DMM1 is combined in the RQT to encode the depth map block, and the DMM mode: the DMM1 is written to the bitstream.

There may be multiple manners of representing a DMM mode in encoding information. For example: the DMM1 is represented by 0, and the DMM4 is represented by 1. Certainly, there may be another indication manner.

According to this embodiment of the present invention, a depth map block to be encoded is acquired; when a depth modeling mode DMM is applied to a recursive quadtree RQT or simplified depth coding SDC to encode the depth map block, the depth map block is separately detected by using a DMM1 mode and a DMM4 mode in the DMM, to obtain a rate-distortion result of the depth map block in the DMM1 mode and a rate-distortion result of the depth map block in the DMM4 mode; and it is determined that a DMM mode with a smallest rate-distortion result in the DMM1 and the DMM4 is a DMM mode used during encoding, the used mode is applied to the RQT or the SDC to encode the depth map block, and the used DMM mode is written to a bitstream. Compared with the prior art in which four modes need to be detected during encoding/decoding, according to the encoding method provided in this embodiment of the present invention, only two modes need to be detected. Therefore, encoding complexity is reduced, and encoding efficiency is improved.

Optionally, based on the embodiment corresponding to FIG. 1, in a first optional embodiment of the intra-frame depth map block encoding method provided in this embodiment of the present invention, for the writing the used DMM mode to a bitstream, the method further includes:

writing, to the bitstream, a coding flag used to indicate the RQT or the SDC, where the coding flag is used to instruct a decoder side to perform decoding according to the RQT or the SDC indicated by the coding flag.

In this embodiment of the present invention, when the RQT and SD encoding technologies are preset in an encoder, the DMM includes two modes when combined in the SDC, and the two modes separately correspond to the DMM1 and the DMM4. However, in the prior art, for the SDC, the DMM1 or DMM4 mode is marked by a default offset flag bit being 0 or nonexistence of the offset flag bit. When the DMM is combined in the RQT, the DMM1 or DMM4 mode is marked according to a first offset flag bit being 0 or nonexistence of the first offset flag bit, and a second offset flag bit being 1 or nonexistence of the second offset flag bit; therefore, there are four modes in total. However, in this embodiment of the present invention, only two modes: the DMM1 and the DMM4 are set, and regardless of whether the RQT technology or the SDC technology is used in an encoding/decoding process, only the two modes: the DMM1 and the DMM4 are used during a DMM combination. Therefore, encoding complexity is further reduced, and encoding efficiency is improved.

Although both the RQT and the SDC can be used in an encoding/decoding process, the decoder side needs to be notified of a specific encoding technology used on the encoder side, so that the decoder side performs decoding according to the encoding technology. Therefore, the identifier of the RQT or the SDC needs to be written to the bitstream.

For example, a flag bit may be set. When the flag bit is 0, it represents that the RQT is used; or when the flag bit is 1, it represents that the SDC is used.

Optionally, based on the embodiment corresponding to FIG. 1 or the first optional embodiment, in a second optional embodiment of the intra-frame depth map block encoding method provided in this embodiment of the present invention, the applying the used mode to the RQT or the SDC to encode the depth map block may include:

obtaining a block predicted value and a block offset value of a depth map subblock obtained through segmentation in the used DMM mode, and residual information of each pixel in the depth map subblock according to the used DMM mode, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

Figure 2:
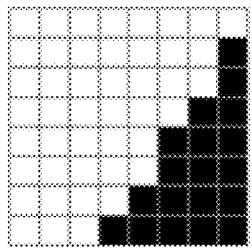
FIG. 2 is a schematic diagram of a DMM1 according to an embodiment of the present invention.
Figure 3:
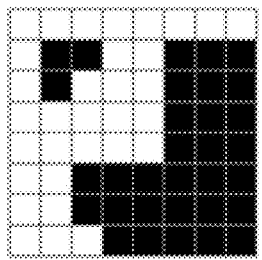
FIG. 3 is a schematic diagram of a DMM4 according to an embodiment of the present invention.

In this embodiment of the present invention, referring to FIG. 2 and FIG. 3, it can be known that a corresponding depth map subblock is obtained by segmenting the depth map block according to the DMM1 or the DMM4, and then the depth map subblock may be encoded.

There may be multiple predefined prediction rules, for example: selecting a depth map block adjacent to the upper left corner of the depth map subblock and calculating an average value of pixel values of pixels in the depth map block, or selecting an adjacent depth map block on the left of the depth map subblock and calculating an average value of pixel values of pixels in the depth map block. There may also be many prediction rules, which are not enumerated herein.

The block original pixel value of the depth map block is an average value of pixel values of all pixels.

The preset mapping relationship is Y=X+1, where x is a difference between the block original pixel value and the block predicted value, and Y is the block offset value obtained through mapping.

The residual information of each pixel in the depth map subblock is a difference between an original pixel value of each pixel in the depth map subblock and a sum of the block predicted value and the block offset value, and may be expressed by using a formula:

$Z=M-(A+Y)$, where Z is the residual information of the pixel, M is the original pixel value of the pixel, A is the block predicted value, and Y is the block offset value.

Optionally, based on the foregoing second optional embodiment, in a third optional embodiment of the intra-frame depth map block encoding method provided in this embodiment of the present invention, before the obtaining residual information of each pixel in the depth map subblock, the method may further include:

adding a block predicted value and the block offset value of the same depth map subblock, to obtain a district constant value of the same depth map subblock; and subtracting the district constant value from an original pixel value of each pixel in the same depth map subblock, to obtain the residual information of each pixel in the depth map subblock.

A sum of the block predicted value and the block offset value is the district constant (DC) value.

Optionally, based on the foregoing third optional embodiment, in a fourth optional embodiment of the intra-frame depth map block encoding method provided in this embodiment of the present invention, the adding a block predicted value and the block offset value of the same depth map subblock, to obtain a district constant value of the same depth map subblock may include:

when a block offset value of at least one depth map subblock is 0, using a predicted value of the depth map subblock whose block offset value is 0 as a district constant value of the depth map subblock whose block offset value is 0.

When a block offset value of a depth map subblock is 0, a predicted value of the depth map subblock whose offset value is 0 is used as a district DC value of the depth map subblock whose offset value is 0.

A district DC value of a depth map subblock may be calculated in this way when a block offset value of only one depth map subblock is 0, or a district DC value of a depth map subblock may be calculated in this way only when block offset values of all depth map subblocks are 0.

Figure 4:
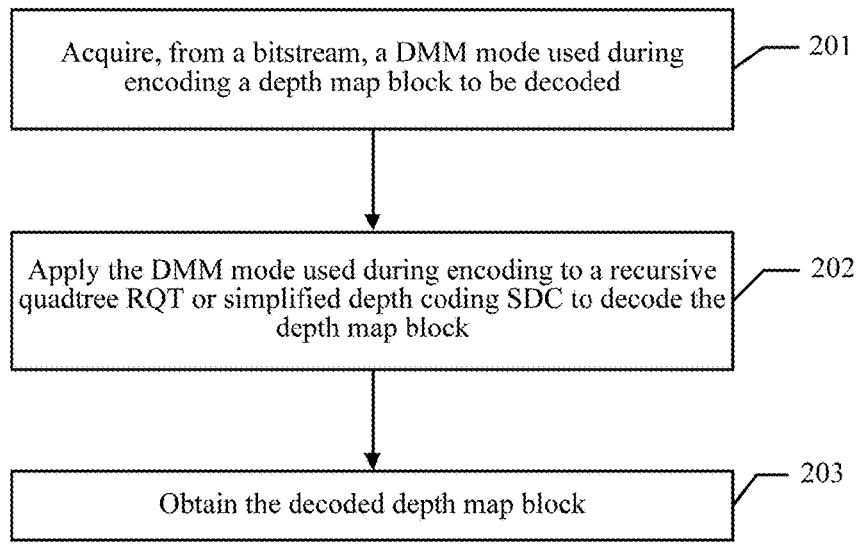
FIG. 4 is a schematic diagram of an embodiment of a decoding method according to an embodiment of the present invention.

Referring to FIG. 4, an embodiment of an intra-frame depth map block decoding method according to an embodiment of the present invention includes:

201: Acquire, from a bitstream, a DMM mode used during encoding a depth map block to be decoded.

The depth modeling mode DMM mode is one of two modes: a DMM1 and a DMM4 that correspond to an encoder side.

202: Apply the DMM mode used during encoding to a recursive quadtree RQT or simplified depth coding SDC to decode the depth map block.

203: Obtain the decoded depth map block.

In this embodiment of the present invention, a DMM mode used during encoding a depth map block to be decoded is acquired from a bitstream; the DMM mode used during encoding is applied to a recursive quadtree RQT or simplified depth coding SDC to decode the depth map block; and the decoded depth map block is obtained. Compared with the prior art in which two modes need to be detected during decoding, according to the decoding method provided in this embodiment of the present invention, an offset flag bit does not need to be detected and decoding processing does not need to be performed for a case in which an offset flag bit is 0 in an RQT. Therefore, decoding complexity is reduced, and decoding efficiency is improved.

Optionally, based on the embodiment corresponding to FIG. 4, in a first optional embodiment of the intra-frame depth map block decoding method provided in this embodiment of the present invention, for the acquiring, from a bitstream, a DMM mode used during encoding a depth map block to be decoded, the method may further include:

acquiring, from the bitstream, an identifier used to indicate whether the RQT or the SDC is used during encoding; and the applying the DMM mode used during encoding to a recursive quadtree RQT or simplified depth coding SDC to decode the depth map block may include:

applying, according to the identifier indicating whether the RQT or the SDC is used during encoding, the DMM mode used during encoding to the RQT or the SDC indicated by the identifier, to decode the depth map block.

In this embodiment of the present invention, the encoder side may perform encoding by using an RQT technology or an SDC technology, and a decoder side needs to determine an encoding technology used by the encoder side for encoding, so as to determine a decoding technology corresponding to the encoding technology.

The encoding technology used during encoding may be determined by using a flag bit in encoding information. For example: when the flag bit is 0, it is determined that an RQT encoding technology is used during encoding; or when the flag bit is 1, it represents that an SDC encoding technology is used during encoding. In this way, when the flag bit is 0, the RQT technology may be used for decoding, and when the flag bit is 1, the SDC technology may be used for decoding.

Optionally, based on the embodiment corresponding to FIG. 4 or the first optional embodiment based on FIG. 4, in a second optional embodiment of the intra-frame depth map block decoding method provided in this embodiment of the present invention, the applying the DMM mode used during encoding to a recursive quadtree RQT or simplified depth coding SDC to decode the depth map block includes:

obtaining a block predicted value and a block offset value of a depth map subblock obtained through segmentation in the DMM mode used during encoding, and residual information of each pixel in the depth map subblock according to the DMM mode used during encoding, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

In this embodiment of the present invention, on the decoder side, the block predicted value is acquired in a same manner as on the encoder side. The decoder side may obtain a predicted value of the current depth map according to a pixel value of an adjacent depth map block that is already decoded.

The block offset value and residual information of each pixel in the depth map block are all acquired from the bitstream during decoding.

Optionally, based on the second optional embodiment, in a third optional embodiment of the intra-frame depth map block decoding method provided in this embodiment of the present invention, before the obtaining residual information of each pixel in the depth map subblock, the method may further include:

adding a block predicted value and the block offset value of the same depth map subblock, to obtain a district constant value of the same depth map subblock; and subtracting the district constant value from an original pixel value of each pixel in the same depth map subblock, to obtain the residual information of each pixel in the depth map subblock.

Optionally, based on the third optional embodiment of the decoder side, in a fourth optional embodiment of the depth map block decoding method provided in this embodiment of the present invention, the calculating a sum of a predicted value and an offset value of a pixel in the depth map subblock, to obtain a district DC value of the pixel in the depth map subblock may include:

when an offset value of each pixel in a depth map subblock is 0, using a predicted value of each pixel in the depth map subblock as a district DC value of each pixel.

Optionally, based on the third optional embodiment of the decoder side, in a third optional embodiment of the intra-frame depth map block decoding method provided in this embodiment of the present invention, the adding a block predicted value and the block offset value of the same depth map subblock, to obtain a district constant value of the same depth map subblock includes:

when a block offset value of at least one depth map subblock is 0, using a predicted value of the depth map subblock whose block offset value is 0 as a district constant value of the depth map subblock whose block offset value is 0.

For ease of understanding, encoding and decoding processes in the embodiments of the present invention are described below by using application scenarios as examples.

Figure 5:
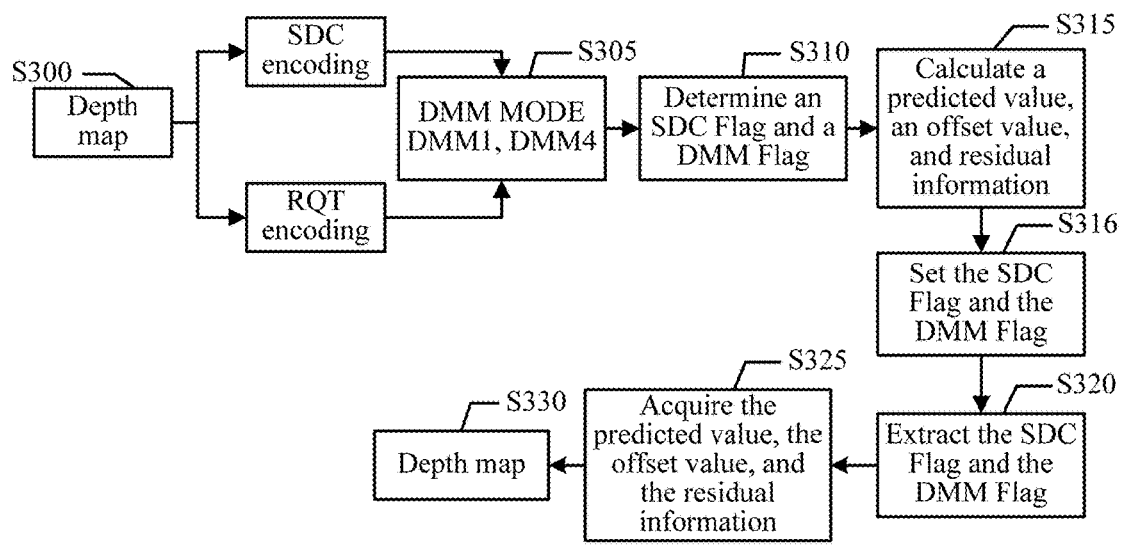
FIG. 5 is a schematic diagram describing an encoding/decoding process according to an embodiment of the present invention.

Referring to FIG. 5, FIG. 5 is a schematic diagram of implementation of a DMM combination in an RQT and SDC.

Two implementation manners of a DMM in an SDC encoding process and four implementation manners of a DMM in an RQT encoding process are combined to obtain two modes: a DMM1 and a DMM4. For details, refer to a process in S305 of FIG. 5.

S300: An encoding process of a depth map block starts.

S305: Regardless of whether SDC encoding or RQT encoding is used, determine, according to rate-distortion results of the depth map block in the DMM1 and the DMM4, whether the DMM1 or the DMM4 is used in the encoding process.

S310: Determine an identifier of an SDC Flag flag bit and an identifier of a DMM Flag flag bit.

In the encoding process of the depth map block, if the SDC encoding is used, the SDC flag flag bit may be set to 1; or if the RQT encoding is used, the SDC flag flag bit may be set to 0. For either the SDC encoding or the RQT encoding, when the DMM1 is used during encoding, a DMM flag bit may be set to 0; or if the DMM4 is used during encoding, a DMM flag bit may be set to 1.

S315: Calculate a predicted value, an offset value, and residual information of the depth map block.

The block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and residual information of each pixel in the depth map subblock is a difference between an original pixel value of each pixel in the depth map subblock and a sum of the block predicted value and the block offset value.

There may be multiple predefined prediction rules, for example: selecting a depth map block adjacent to the upper left corner of the depth map subblock and calculating an average value of pixel values of pixels in the depth map block, or selecting an adjacent depth map block on the left of the depth map subblock and calculating an average value of pixel values of pixels in the depth map block. There may also be many prediction rules, which are not enumerated herein.

The block original pixel value of the depth map block is an average value of pixel values of all pixels.

The preset mapping relationship is Y=X+1, where x is a difference between the block original pixel value and the block predicted value, and Y is the block offset value obtained through mapping.

The residual information of each pixel in the depth map subblock is a difference between an original pixel value of each pixel in the depth map subblock and a sum of the block predicted value and the block offset value, and may be expressed by using a formula:

Z=M−(A+Y), where Z is the residual information of the pixel, M is the original pixel value of the pixel, A is the block predicted value, and Y is the block offset value.

A sum of the block predicted value and the block offset value is a district constant (DC) value.

The residual information of each pixel in the depth map subblock is further obtained according to a difference between the original pixel value of each pixel in the depth map subblock and a corresponding district constant DC value.

S316: Set, in encoding information, the identifier of the SDC Flag flag bit and the identifier of the DMM Flag flag bit that are determined in S310.

S320: In a decoding process, after acquiring encoding information to be decoded, the decoder side extracts the identifier of the SDC Flag flag bit and the identifier of DMM Flag flag bit, and determines, according to the identifiers, a decoding technology and a DMM mode that are to be used.

S325: Acquire the block predicted value and the block offset value of the depth map subblock during encoding, and residual information of each pixel in the depth map block according to a DMM mode used during encoding and the RQT or the SDC used during encoding the depth map block.

S330: Reconstruct the depth map block.

A specific process of reconstructing the depth map block may be:

determining a block predicted value of a depth map subblock of the depth map block according to the DMM mode used during encoding;

acquiring, from the bitstream, a block offset value of the depth map subblock and residual information of each pixel in the depth map subblock;

calculating a sum of the block predicted value and the block offset value of the depth map subblock, to obtain a district constant DC value of the depth map subblock; and obtaining a reconstruction value of each pixel in the depth map subblock according to the district constant DC value of the depth map subblock and the residual information of each pixel in the depth map subblock, and finally obtaining a reconstructed image of the depth map block.

Figure 6:
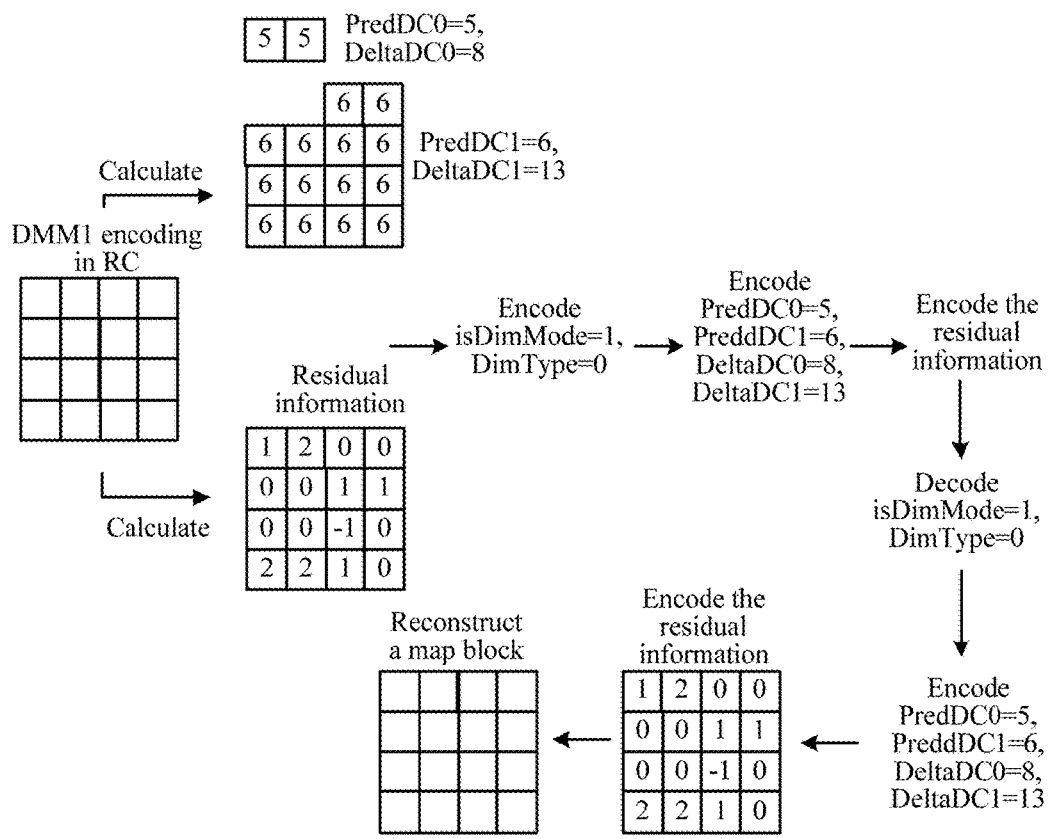
FIG. 6 is a schematic diagram describing another encoding/decoding process according to an embodiment of the present invention.

Referring to FIG. 6, it is assumed that intra-frame encoding/decoding is performed on a depth map block. When intra-frame encoding is performed on a 4×4 depth map block, assuming that a DMM1 mode in an RQT is selected to implement the encoding, the depth map block is segmented according to a DMM1 and two depth map subblocks are obtained. It is obtained through calculation that a block predicted value of a first depth map subblock is PredDC0=5, and a block offset value is DeltaDC0=8; and it is obtained through calculation that a block predicted value of a second depth map subblock is PredDC1=6, and a block offset value is DeltaDC1=13. A sum of PredDC0=5 and DeltaDC0=8 is a district constant DC value of the first depth map subblock. Therefore, it may be obtained through calculation that the district constant DC value of the first depth map subblock is 13, and the district constant DC value of the second depth map subblock is 19. Then, a corresponding district constant DC value is subtracted from an original pixel value of a pixel in the depth map block, to obtain residual information of each pixel in the depth map block shown in FIG. 6. For a DMM mode, when a flag bit (isDimMode) is 1, it represents that the DMM mode is used, and when a DMM mode flag bit (DimType) is 0, it represents that is the DMM1 is used. Further, DeltaDC0, DeltaDC1, and the residual information are encoded. A decoder side decodes the DMM mode, and may know, from the flag bit (isDimMode) being 1, that the DMM mode is used during encoding. Further, the decoder side decodes the DMM mode flag bit (DimType), and obtains 0 through decoding, which represents that the DMM1 is used during encoding; then decodes DeltaDC0 and DeltaDC1, and obtains corresponding values of 8 and 13; and finally decodes the residual information. The decoder side may obtain, through calculation by using a same policy as an encoder side does, that the block predicted value of the first depth map subblock is PredDC0=5, and the block predicted value of the second depth map subblock is PredDC1=6; calculate a sum of PredDC0 and DeltaDC0 to obtain that the district constant of the first depth map subblock is DC0=13; calculate a sum of PredDC1 and DeltaDC1 to obtain that the district constant of the second depth map subblock is DC1=19; then calculate a sum of the district constant DC0=13 and a pixel value of a corresponding pixel and a sum of the district constant DC1=19 and a pixel value of a corresponding pixel according to the residual information shown in FIG. 6, to obtain a reconstruction value of each pixel in the depth map block; and reconstructs the 4×4 depth map block.

Figure 7:
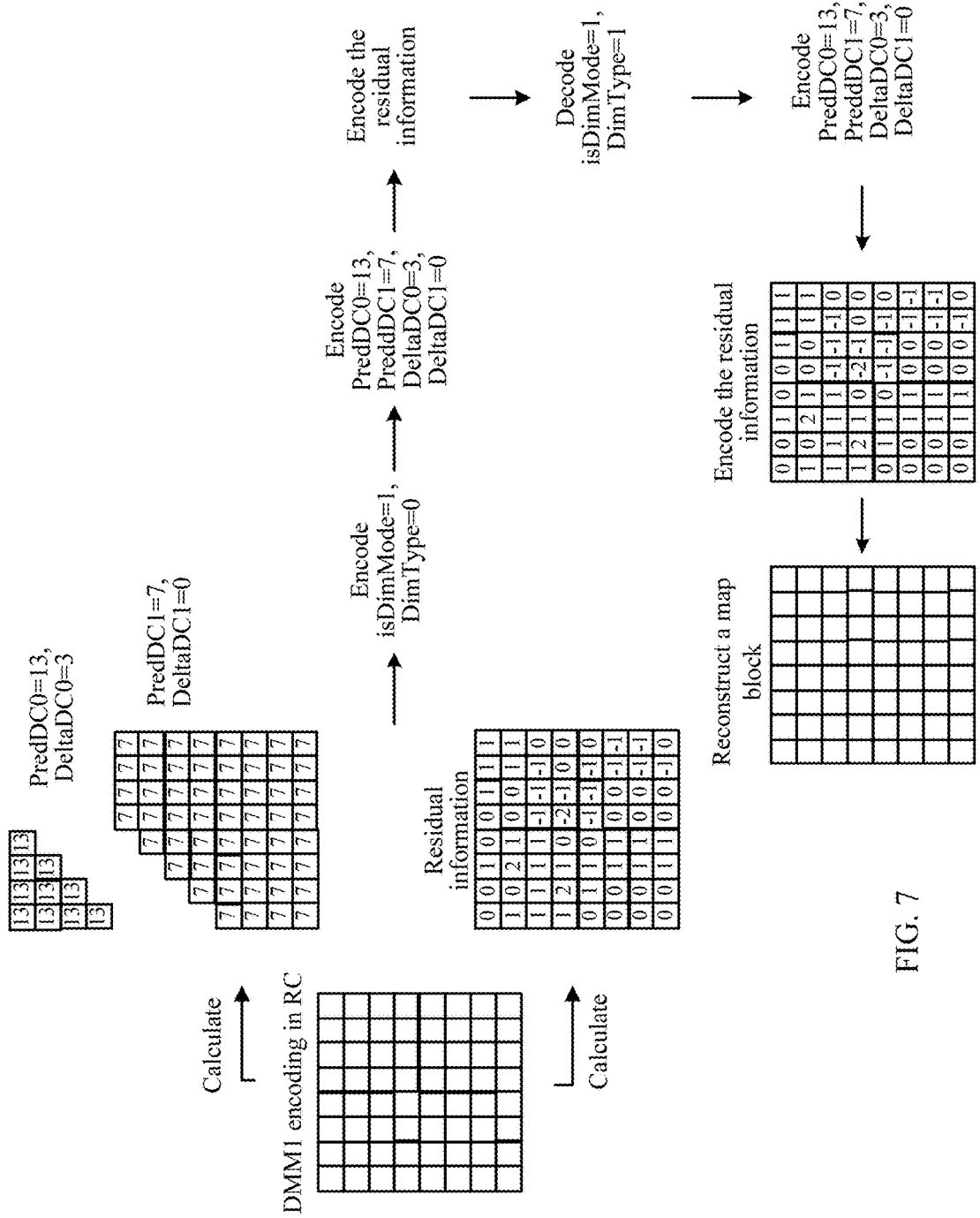
FIG. 7 is a schematic diagram describing another encoding/decoding process according to an embodiment of the present invention.

Referring to FIG. 7, it is assumed that intra-frame encoding/decoding is performed on a depth map block. When intra-frame encoding is performed on an 8×8 depth map block, assuming that a DMM1 mode in an RQT is selected to implement the encoding, the depth map block is segmented according to a DMM1 and two depth map subblocks are obtained. It is obtained through calculation that a block predicted value of each pixel in a first depth map subblock is PredDC0=13, and a block offset value is DeltaDC0=3; and it is obtained through calculation that a block predicted value of each pixel in a second depth map subblock is PredDC1=7, and a block offset value is DeltaDC1=0. A sum of PredDC0=13 and DeltaDC0=3 is a district constant DC value of the first depth map subblock. Therefore, it may be obtained through calculation that a district constant of the first depth map subblock is DC0=16, and a district constant of the second depth map subblock is DC1=19. Then, a corresponding district constant DC value is subtracted from an original pixel value of each pixel in the depth map block, to obtain residual information of each pixel in the depth map block shown in FIG. 7. For a DMM mode, when a flag bit (isDimMode) is 1, it represents that the DMM mode is used, and when a DMM mode flag bit (DimType) is 0, it represents that is the DMM1 is used. Further, DeltaDC0, DeltaDC1, and the residual information are encoded. A decoder side decodes the DMM mode, and may know, from the flag bit (isDimMode) being 1, that the DMM mode is used during encoding; further, decodes the DMM mode flag bit (DimType), and obtains 0 through decoding, which represents that the DMM1 is used during encoding; then decodes DeltaDC0 and DeltaDC1, and obtains corresponding values of 3 and 0; and finally decodes the residual information, to obtain the residual information of the depth map block shown in FIG. 7. The decoder side may obtain, through calculation by using a same policy as an encoder side does, that the block predicted value of the first depth map subblock is PredDC0=13, and the block predicted value of the second depth map subblock is PredDC1=7; calculate a sum of PredDC0 and DeltaDC0 to obtain that the district constant of the first depth map subblock is DC0=16; calculate a sum of PredDC1 and DeltaDC1 to obtain that the district constant of the second depth map subblock is DC1=7, where because DeltaDC1=0, PredDC1=7 may be directly assigned to the district constant DC1=7; then, calculate a sum of the district DC0=16 and residual information of a corresponding pixel and a sum of the district DC1=7 and residual information of a corresponding pixel according to the residual information shown in FIG. 7, to obtain a reconstruction value of each pixel in the depth map block; and reconstructs the 8×8 depth map block.

Figure 8:
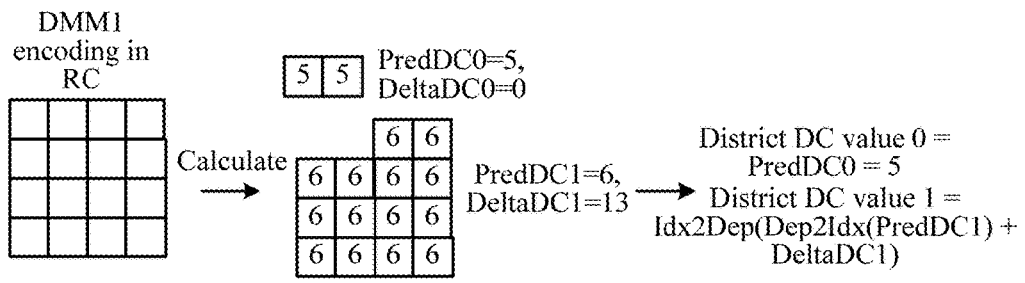
FIG. 8 is a schematic diagram describing another decoding process according to an embodiment of the present invention.

Referring to FIG. 8, it is assumed that intra-frame encoding/decoding is performed on a depth map block. When intra-frame encoding is performed on a 4×4 depth map block, assuming that a DMM1 mode in an RQT is selected to implement the encoding, it is obtained through calculation that PredDC0=5, PredDC1=6, DeltaDC0=0, and DeltaDC1=13. Because DeltaDC0=0, PredDC0 may be directly assigned to the district DC0 to obtain that DC0=5. The district DC1 is obtained through calculation according to steps described in FIG. 6 or FIG. 7.

Figure 9:
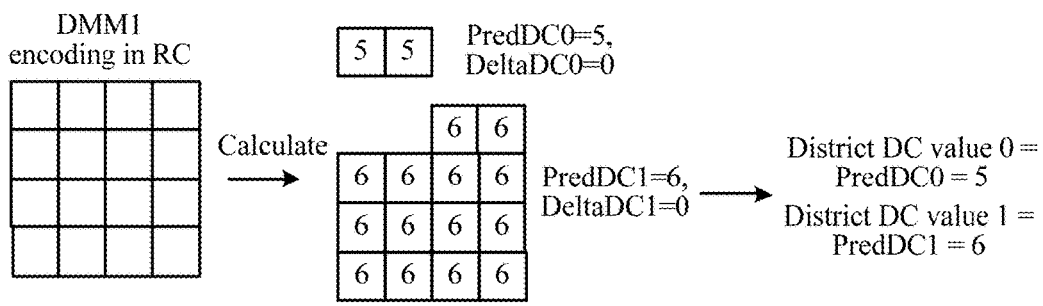
FIG. 9 is a schematic diagram describing another decoding process according to an embodiment of the present invention.

Referring to FIG. 9, it is assumed that intra-frame encoding/decoding is performed on a depth map block. When intra-frame encoding is performed on a 4×4 depth map block, assuming that a DMM1 mode in an RQT is selected to implement the encoding, it is obtained through calculation that PredDC0=5, PredDC1=6, DeltaDC0=0, and DeltaDC1=0. Because DeltaDC0=DeltaDC1=0, PredDC0 and PredDC1 may be directly assigned to the district DC0 and the district DC1 respectively to obtain that the district DC0 and the district DC1 are respectively 5 and 6.

Figure 10:
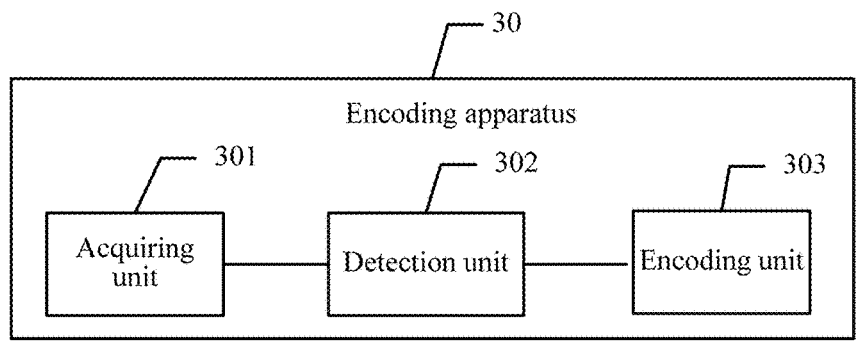
FIG. 10 is a schematic diagram of an embodiment of an encoding apparatus according to an embodiment of the present invention.

Referring to FIG. 10, an embodiment of an encoding apparatus 30 according to an embodiment of the present invention includes:

an acquiring unit 301, configured to acquire a depth map block to be encoded;

a detection unit 302, configured to: when a depth modeling mode DMM is applied to a recursive quadtree RQT or simplified depth coding SDC to encode the depth map block acquired by the acquiring unit 301, separately detect the depth map block by using a DMM1 mode and a DMM4 mode in the DMM, to obtain a rate-distortion result of the depth map block in the DMM1 mode and a rate-distortion result of the depth map block in the DMM4 mode; and an encoding unit 303, configured to: determine that a DMM mode, whose rate-distortion result is the smallest in the rate-distortion results of the DMM1 and the DMM4 that are obtained through detection by the detection unit 302, is a DMM mode used during encoding, apply the used mode to the RQT or the SDC to encode the depth map block, and write the used DMM mode to a bitstream.

In this embodiment of the present invention, the acquiring unit 301 acquires a depth map block to be encoded; when a depth modeling mode DMM is applied to a recursive quadtree RQT or simplified depth coding SDC to encode the depth map block acquired by the acquiring unit 301, the detection unit 302 separately detects the depth map block by using a DMM1 mode and a DMM4 mode in the DMM, to obtain a rate-distortion result of the depth map block in the DMM1 mode and a rate-distortion result of the depth map block in the DMM4 mode; and the encoding unit 303 determines that a DMM mode, whose rate-distortion result is the smallest in the rate-distortion results of the DMM1 and the DMM4 that are obtained through detection by the detection unit 302, is a DMM mode used during encoding, applies the used mode to the RQT or the SDC to encode the depth map block, and writes the used DMM mode to a bitstream. Compared with the prior art in which four modes need to be detected during encoding/decoding, according to the encoding method provided in this embodiment of the present invention, only two modes need to be detected. Therefore, encoding complexity is reduced, and encoding efficiency is improved.

Optionally, based on the embodiment corresponding to FIG. 10, in another embodiment of the encoding apparatus provided in this embodiment of the present invention, the encoding unit 303 is further configured to write, to the bitstream, a coding flag used to indicate the RQT or the SDC, where the coding flag is used to instruct a decoder side to perform decoding according to the RQT or the SDC indicated by the coding flag.

Optionally, based on the embodiment corresponding to FIG. 10, in another embodiment of the encoding apparatus provided in this embodiment of the present invention, the encoding unit 303 is specifically configured to obtain a block predicted value and a block offset value of a depth map subblock obtained through segmentation in the used DMM mode, and residual information of each pixel in the depth map subblock according to the used DMM mode, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

Optionally, based on the embodiment corresponding to FIG. 10, in another embodiment of the encoding apparatus provided in this embodiment of the present invention, the encoding unit 303 is specifically configured to: add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

Optionally, based on the embodiment corresponding to FIG. 10, in another embodiment of the encoding apparatus provided in this embodiment of the present invention, the encoding unit 303 is specifically configured to: when a block offset value of at least one depth map subblock is 0, use a predicted value of the depth map subblock whose block offset value is 0 as a district constant value of the depth map subblock whose the block offset value is 0.

Figure 11:
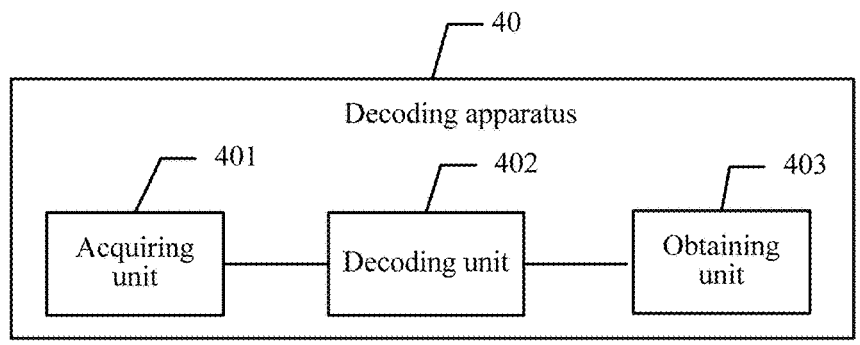
FIG. 11 is a schematic diagram of an embodiment of a decoding apparatus according to an embodiment of the present invention.

Referring to FIG. 11, an embodiment of a decoding apparatus 40 according to an embodiment of the present invention includes:

an acquiring unit 401, configured to acquire, from a bitstream, a DMM mode used during encoding a depth map block to be decoded;

a decoding unit 402, configured to apply the DMM mode used during encoding to a recursive quadtree RQT or simplified depth coding SDC to decode the depth map block acquired by the acquiring unit 401; and an obtaining unit 403, configured to obtain the depth map block decoded by the decoding unit 402.

In this embodiment of the present invention, the acquiring unit 401 acquires, from a bitstream, a DMM mode used during encoding a depth map block to be decoded; the decoding unit 402 applies the DMM mode used during encoding to a recursive quadtree RQT or simplified depth coding SDC to decode the depth map block acquired by the acquiring unit 401; and the obtaining unit 403 obtains the depth map block decoded by the decoding unit 402. Compared with the prior art in which two modes need to be detected during decoding, according to the decoding method provided in this embodiment of the present invention, an offset flag bit does not need to be detected and decoding processing does not need to be performed for a case in which an offset flag bit is 0 in an RQT. Therefore, decoding complexity is reduced, and decoding efficiency is improved.

Optionally, based on the embodiment corresponding to FIG. 11, in another embodiment of the decoding apparatus provided in this embodiment of the present invention, the acquiring unit 401 is further configured to acquire, from the bitstream, an identifier used to indicate whether the RQT or the SDC is used during encoding; and the decoding unit 402 is specifically configured to apply, according to the identifier indicating whether the RQT or the SDC is used during encoding, the DMM mode used during encoding to the RQT or the SDC indicated by the identifier, to decode the depth map block.

Optionally, based on the embodiment corresponding to FIG. 11, in another embodiment of the decoding apparatus provided in this embodiment of the present invention, the decoding unit 402 is specifically configured to obtain a block predicted value and a block offset value of a depth map subblock obtained through segmentation in the DMM mode used during encoding, and residual information of each pixel in the depth map subblock according to the DMM mode used during encoding, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

Optionally, based on the embodiment corresponding to FIG. 11, in another embodiment of the decoding apparatus provided in this embodiment of the present invention, the decoding unit 402 is specifically configured to: add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

Optionally, based on the embodiment corresponding to FIG. 11, in another embodiment of the decoding apparatus provided in this embodiment of the present invention, the decoding unit 402 is specifically configured to: when a block offset value of at least one depth map subblock is 0, use a predicted value of the depth map subblock whose block offset value is 0 as a district constant value of the depth map subblock whose the block offset value is 0.

Figure 12:
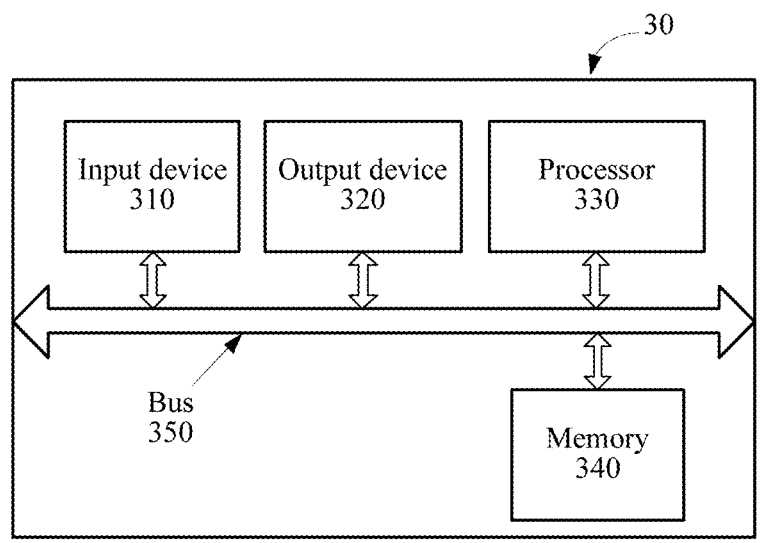
FIG. 12 is a schematic diagram of an embodiment of an encoding apparatus according to an embodiment of the present invention.

FIG. 12 is a schematic structural diagram of an encoding apparatus 30 according to an embodiment of the present invention. The encoding apparatus 30 may include an input device 310, an output device 320, a processor 330, and a memory 340.

The memory 340 may include a read-only memory and a random access memory, and provides an instruction and data to the processor 330. A part of the memory 340 may further include a non-volatile random access memory (NVRAM).

The memory 340 stores the following elements, executable modules or data structures, or a subset thereof, or an extension set thereof:

operation instructions: including various operation instructions, used to implement various operations; and an operating system: including various system programs, used to implement various fundamental services and process hardware-based tasks.

In this embodiment of the present invention, the processor 330 performs, by invoking the operation instructions (where the operation instructions may be stored in the operating system) stored in the memory 340, the following operations:

acquiring a depth map block to be encoded;

when a depth modeling mode DMM is applied to a recursive quadtree RQT or simplified depth coding SDC to encode the depth map block, separately detecting the depth map block by using a DMM1 mode and a DMM4 mode in the DMM, to obtain a rate-distortion result of the depth map block in the DMM1 mode and a rate-distortion result of the depth map block in the DMM4 mode; and determining that a DMM mode with a smallest rate-distortion result in the DMM1 and the DMM4 is a DMM mode used during encoding, applying the used mode to the RQT or the SDC to encode the depth map block, and writing the used DMM mode to a bitstream.

In this embodiment of the present invention, the encoding apparatus 30 needs to detect only two modes during encoding. Therefore, encoding complexity is reduced, and encoding efficiency is improved.

The processor 330 controls an operation of the encoding apparatus 30, and the processor 330 may also be referred to as a CPU (Central Processing Unit, central processing unit). The memory 340 may include a read-only memory and a random access memory, and provides an instruction and data to the processor 330. A part of the memory 340 may further include a non-volatile random access memory (NVRAM). In a specific application, components of the encoding apparatus 30 are coupled together by using a bus system 350. In addition to a data bus, the bus system 350 may also include a power bus, a control bus, a status signal bus, and the like. However, for clear description, various types of buses in the figure are all marked as the bus system 350.

The methods disclosed in the foregoing embodiments of the present invention may be applied to the processor 330, or implemented by the processor 330. The processor 330 may be an integrated circuit chip and has a signal processing capability. In an implementation process, steps of the foregoing methods may be performed by using an integrated logic circuit of hardware in the processor 330 or an instruction in a form of software. The foregoing processor 330 may be a general purpose processor, a digital signal processor (DSP), an application-specific integrated circuit (ASIC), a field programmable gate array (FPGA), or another programmable logic device, discrete gate or transistor logic device, or discrete hardware component. The processor 330 may implement or execute methods, steps and logical block diagrams disclosed in the embodiments of the present invention. The general purpose processor may be a microprocessor or the processor may be any conventional processor or the like. Steps of the methods disclosed with reference to the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 340, and the processor 330 reads information in the memory 340 and completes the steps of the foregoing methods in combination with hardware of the processor 330.

Optionally, the processor 330 may further write, to the bitstream, a coding flag used to indicate the RQT or the SDC, where the coding flag is used to instruct a decoder side to perform decoding according to the RQT or the SDC indicated by the coding flag.

Optionally, the processor 330 may specifically obtain a block predicted value and a block offset value of a depth map subblock obtained through segmentation in the used DMM mode, and residual information of each pixel in the depth map subblock according to the used DMM mode, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

Optionally, the processor 330 may specifically:

add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

Optionally, the processor 330 may specifically: when a block offset value of at least one depth map subblock is 0, use a predicted value of the depth map subblock whose block offset value is 0 as a district constant value of the depth map subblock whose block offset value is 0.

Figure 13:
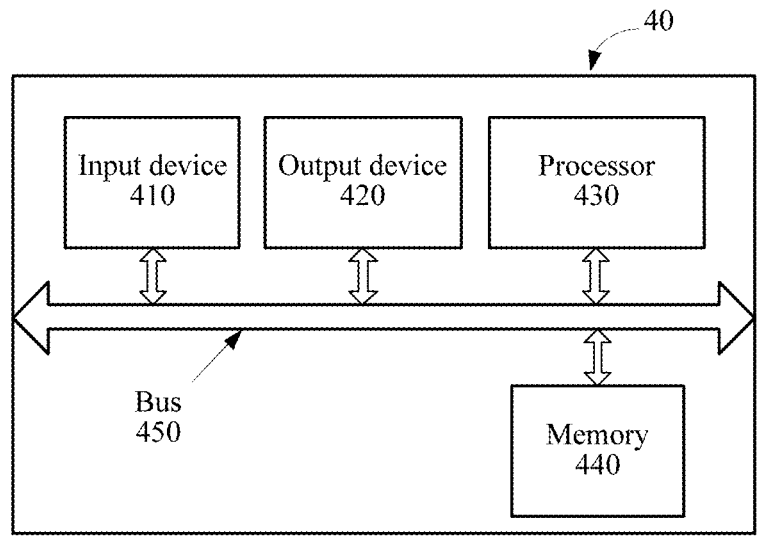
FIG. 13 is a schematic diagram of an embodiment of a decoding apparatus according to an embodiment of the present invention.

FIG. 13 is a schematic structural diagram of a decoding apparatus 40 according to an embodiment of the present invention. The decoding apparatus 40 may include an input device 410, an output device 420, a processor 430, and a memory 440.

The memory 440 may include a read-only memory and a random access memory, and provides an instruction and data to the processor 430. Apart of the memory 440 may further include a non-volatile random access memory (NVRAM).

The memory 440 stores the following elements, executable modules or data structures, or a subset thereof, or an extension set thereof:

operation instructions: including various operation instructions, used to implement various operations; and an operating system: including various system programs, used to implement various fundamental services and process hardware-based tasks.

In this embodiment of the present invention, the processor 430 performs, by invoking the operation instructions (where the operation instructions may be stored in the operating system) stored in the memory 440, the following operations:

acquiring, from a bitstream, a DMM mode used during encoding a depth map block to be decoded;

applying the DMM mode used during encoding to a recursive quadtree RQT or simplified depth coding SDC to decode the depth map block; and obtaining the decoded depth map block.

In this embodiment of the present invention, the decoding apparatus 40 does not need to detect an offset flag bit and does not need to perform decoding processing for a case in which an offset flag bit is 0 in an RQT. Therefore, decoding complexity is reduced, and decoding efficiency is improved.

The processor 430 controls an operation of the decoding apparatus 40, and the processor 430 may also be referred to as a CPU (Central Processing Unit, central processing unit). The memory 440 may include a read-only memory and a random access memory, and provides an instruction and data to the processor 430. A part of the memory 440 may further include a non-volatile random access memory (NVRAM). In a specific application, components of the decoding apparatus 40 are coupled together by using a bus system 450. In addition to a data bus, the bus system 450 may also include a power bus, a control bus, a status signal bus, and the like. However, for clear description, various types of buses in the figure are all marked as the bus system 450.

The methods disclosed in the foregoing embodiments of the present invention may be applied to the processor 430, or are implemented by the processor 430. The processor 430 may be an integrated circuit chip and has a signal processing capability. In an implementation process, steps of the foregoing methods may be performed by using an integrated logic circuit of hardware in the processor 430 or an instruction in a form of software. The foregoing processor 430 may be a general purpose processor, a digital signal processor (DSP), an application-specific integrated circuit (ASIC), a field programmable gate array (FPGA), or another programmable logic device, discrete gate or transistor logic device, or discrete hardware component. The processor 430 may implement or execute methods, steps and logical block diagrams disclosed in the embodiments of the present invention. The general purpose processor may be a microprocessor or the processor may be any conventional processor or the like. Steps of the methods disclosed with reference to the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 440, and the processor 430 reads information in the memory 440 and completes the steps of the foregoing methods in combination with hardware of the processor 430.

Optionally, the processor 430 may further acquire, from the bitstream, an identifier used to indicate whether the RQT or the SDC is used during encoding.

The processor may specifically apply, according to the identifier indicating whether the RQT or the SDC is used during encoding, the DMM mode used during encoding to the RQT or the SDC indicated by the identifier, to decode the depth map block.

Optionally, the processor 430 may specifically:

obtain a block predicted value and a block offset value of a depth map subblock obtained through segmentation in the DMM mode used during encoding, and residual information of each pixel in the depth map subblock according to the DMM mode used during encoding, where the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

Optionally, the processor 430 may specifically:

add a block predicted value and the block offset value of the same depth map subblock, to obtain a district constant value of the same depth map subblock; and subtract the district constant value from an original pixel value of each pixel in the same depth map subblock, to obtain residual information of each pixel in the depth map subblock.

Optionally, the processor 430 may specifically:

when a block offset value of at least one depth map subblock is 0, use a predicted value of the depth map subblock whose block offset value is 0 as a district constant value of the depth map subblock whose block offset value is 0.

A person of ordinary skill in the art may understand that all or some of the steps of the methods in the embodiments may be implemented by a program instructing relevant hardware (such as a processor). The program may be stored in a computer readable storage medium. The storage medium may include: a ROM, a RAM, a magnetic disk, or an optical disc.

The method for determining a discontinuous receive period, the user equipment, and the system that are provided in the embodiments of the present invention are described in detail above. The principle and implementation manners of the present invention are described in this specification through specific examples. The description about the foregoing embodiments is merely provided to help understand the method and core ideas of the present invention. In addition, a person of ordinary skill in the art can make modifications to the specific implementation manners and application scopes according to the ideas of the present invention. Therefore, the content of this specification shall not be construed as a limit to the present invention.

What is claimed is:

1. An intra-frame depth map block encoding method, comprising:

acquiring a depth map block to be encoded;

when a depth modeling mode (DMM) is applied to a recursive quadtree (RQT) or simplified depth coding (SDC) to encode the depth map block, separately detecting the depth map block by using a DMM1 mode and a DMM4 mode in the DMM, to obtain a rate-distortion result of the depth map block in the DMM1 mode and a rate-distortion result of the depth map block in the DMM4 mode; and determining that a DMM with a smallest rate-distortion result in the DMM1 and the DMM4 is a DMM used during encoding, applying the used mode to the RQT or the SDC to encode the depth map block, and writing the used DMM to a bitstream.

2. The method according to claim 1, wherein writing the used DMM to a bitstream comprises:

writing, to the bitstream, a coding flag for indicating the RQT or the SDC.

3. The method according to claim 1, wherein applying the used mode to the RQT or the SDC to encode the depth map block comprises:

obtaining a block predicted value and a block offset value of a depth map subblock obtained through segmentation in the used DMM, and residual information of each pixel in the depth map subblock according to the used DMM, wherein the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

4. The method according to claim 3, wherein before obtaining residual information of each pixel in the depth map subblock, the method further comprises:

adding a block predicted value and the block offset value of the same depth map subblock, to obtain a district constant value of the same depth map subblock; and subtracting the district constant value from an original pixel value of each pixel in the same depth map subblock, to obtain the residual information of each pixel in the depth map subblock.

5. The method according to claim 4, wherein adding a block predicted value and the block offset value of the same depth map subblock, to obtain a district constant value of the same depth map subblock comprises:

when a block offset value of at least one depth map subblock is 0, using a predicted value of the depth map subblock whose block offset value is 0 as a district constant value of the depth map subblock whose block offset value is 0.

6. An intra-frame depth map block decoding method, comprising:

acquiring, from a bitstream, a depth modeling mode (DMM) used during encoding a depth map block to be decoded;

applying the DMM used during encoding to a recursive quadtree (RQT) or simplified depth coding (SDC) to decode the depth map block;

obtaining the decoded depth map block; and wherein applying the DMM used during encoding to a recursive quadtree (RQT) or simplified depth coding (SDC) to decode the depth map block comprises:

obtaining a block predicted value and a block offset value of a depth map subblock obtained through segmentation in the DMM used during encoding, and residual information of each pixel in the depth map subblock according to the DMM used during encoding, wherein the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

7. The method according to claim 6, wherein before obtaining residual information of each pixel in the depth map subblock, the method further comprises:

adding a block predicted value and the block offset value of the same depth map subblock, to obtain a district constant value of the same depth map subblock; and subtracting the district constant value from an original pixel value of each pixel in the same depth map subblock, to obtain the residual information of each pixel in the depth map subblock.

8. The method according to claim 7, wherein adding a block predicted value and the block offset value of the same depth map subblock, to obtain a district constant value of the same depth map subblock comprises:

when a block offset value of at least one depth map subblock is 0, using a predicted value of the depth map subblock whose block offset value is 0 as a district constant value of the depth map subblock whose block offset value is 0.

9. An encoding apparatus, comprising:

an acquiring, configured to acquire a depth map block to be encoded;

a detection unit, configured to: when a depth modeling mode (DMM) is applied to a recursive quadtree (RQT) or simplified depth coding (SDC) to encode the depth map block acquired by the acquiring unit, separately detect the depth map block by using a DMM1 mode and a DMM4 mode in the DMM, to obtain a rate-distortion result of the depth map block in the DMM1 mode and a rate-distortion result of the depth map block in the DMM4 mode; and an encoding unit, configured to:

determine that a DMM, whose rate-distortion result is the smallest in the rate-distortion results of the DMM1 and the DMM4 that are obtained through detection by the detection unit, is a DMM used during encoding, apply the used mode to the RQT or the SDC to encode the depth map block, and write the used DMM to a bitstream.

10. The encoding apparatus according to claim 9, wherein the encoding unit is further configured to write, to the bitstream, a coding flag for indicating the RQT or the SDC, wherein the coding flag enables a decoder side to perform decoding according to the RQT or the SDC indicated by the coding flag.

11. The encoding apparatus according to claim 9, wherein the encoding unit is configured to:
obtain a block predicted value and a block offset value of a depth map subblock obtained through segmentation in the used DMM, and residual information of each pixel in the depth map subblock according to the used DMM, wherein the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value.

12. The encoding apparatus according to claim 11, wherein the encoding unit is configured to:
add a block predicted value and the block offset value of the same depth map subblock, to obtain a district constant value of the same depth map subblock; and
subtract the district constant value from an original pixel value of each pixel in the same depth map subblock, to obtain residual information of each pixel in the depth map subblock.

13. The encoding apparatus according to claim 12, wherein the encoding unit is configured to:
when a block offset value of at least one depth map subblock is 0, use a predicted value of the depth map subblock whose block offset value is 0 as a district constant value of the depth map subblock whose block offset value is 0.

14. A decoding apparatus, comprising:
an acquiring unit, configured to acquire, from a bitstream, a depth modeling mode (DMM) used during encoding a depth map block to be decoded;
a decoding unit, configured to:
apply the DMM used during encoding to a recursive quadtree (RQT) or simplified depth coding (SDC) to decode the depth map block acquired by the acquiring unit, and
obtain a block predicted value and a block offset value of a depth map subblock obtained through segmentation in the DMM used during encoding, and residual information of each pixel in the depth map subblock according to the DMM used during encoding, wherein the block predicted value is obtained according to a predefined prediction rule by using a depth map block adjacent to the depth map subblock, the block offset value is obtained by mapping a difference between a block original pixel value of the depth map block and the block predicted value according to a preset mapping relationship, and the residual information of each pixel in the depth map subblock is a difference between an original pixel value of each pixel in the depth map subblock and a sum of the block predicted value and the block offset value; and
an obtaining unit, configured to obtain the depth map block decoded by the decoding unit.

15. The decoding apparatus according to claim 14, wherein the decoding unit is configured to:
add a block predicted value and the block offset value of the same depth map subblock, to obtain a district constant value of the same depth map subblock; and
subtract the district constant value from an original pixel value of each pixel in the same depth map subblock, to obtain residual information of each pixel in the depth map subblock.

16. The decoding apparatus according to claim 15, wherein the decoding unit is configured to:
when a block offset value of at least one depth map subblock is 0, use a predicted value of the depth map subblock whose block offset value is 0 as a district constant value of the depth map subblock whose block offset value is 0.

* * * * *